Sept. 28, 1926.
L. C. HILDERBRAND
COMBINATION TRUCK, LADDER, AND SUPPORT
Filed March 8, 1926
1,601,250
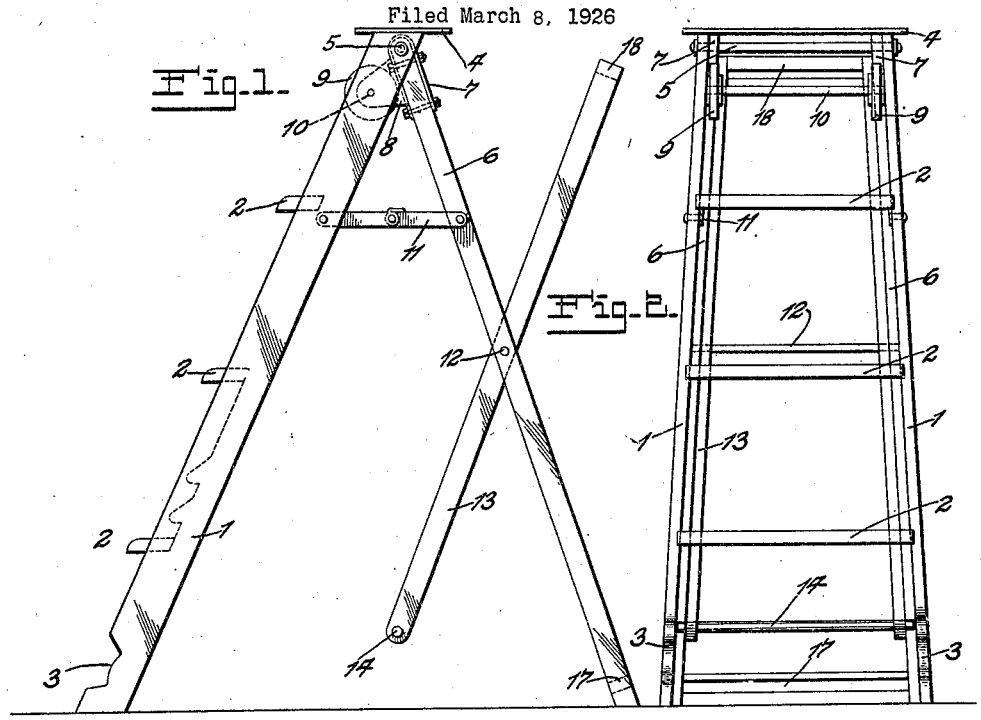
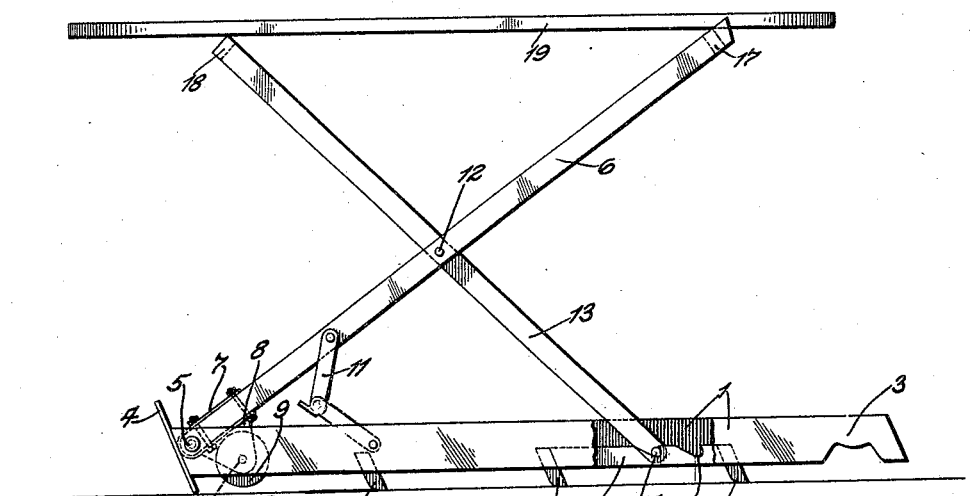
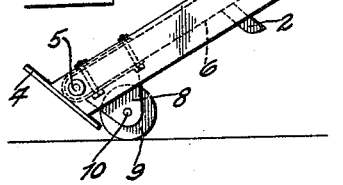
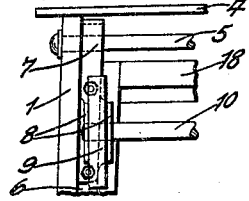
Inventor:
Leslie C. Hilderbrand,
by Rippey & Kingsland,
His Attorneys.

Patented Sept. 28, 1926.

1,601,250

UNITED STATES PATENT OFFICE.

LESLIE C. HILDERBRAND, OF NASHVILLE, ILLINOIS.

COMBINATION TRUCK, LADDER, AND SUPPORT.

Application filed March 8, 1926. Serial No. 93,126.

This invention is a device adapted to be applied to many uses and specifically may be operated as a truck, ladder and support for an ironing board or other article.

An object of the invention is to provide a device that may be conveniently applied to various uses without being dismembered or provided with additional equipment when it is desired to apply the device for any of the uses for which it is intended.

In the specific embodiment of the invention shown, the device is readily applicable for use as a step ladder, a support for an ironing board or the like, or a wheeled truck, and in all of such uses certain of the parts essentially cooperate with the same parts with which they cooperate in any use.

Other objects of the invention will appear from the following description, reference being made to the drawing, in which—

Fig. 1 is a side elevation of the device opened to disclose the different cooperative parts thereof.

Fig. 2 is a front elevation.

Fig. 3 is a side elevation of the device used as a support for an ironing board or the like.

Fig. 4 is a view showing the relationship of essential parts of the device when used as a two-wheeled truck.

Fig. 5 is a rear elevation of a part of the truck equipment.

The invention shown comprises a pair of side bars 1 rigidly connected by a number of transverse parts 2, which may be disposed and arranged to serve as the steps of a ladder when it is desired to use the device for that purpose. One end of each of the side bars is formed to provide a handle 3 which may be grasped by the hand when the device is used as a truck, and which may rest upon the ground or floor when the device is used as a step ladder. The opposite ends of the bars 1 are rigidly connected by a metallic plate 4 designed as a support for the user or any articles which it may be desired to place thereon when the device is used as a ladder, and which also functions as a support for articles on the truck, when the device is used for that purpose, as will be understood by reference to Fig. 4.

The ends of the bars 1 adjacent to the plate 4 are connected by a rod 5 to which are pivoted the ends of a pair of arms 6. The ends of the arms 6 are engaged between the arms of bifurcated brackets 7, each of which is formed with a pair of integral ears 8. A wheel 9 is rotatively mounted between each pair of ears 8 on an axle 10 extending transversely across and connecting the two pairs of ears.

The arms 6 are movable to a position between the bars 1 against the parts 2 to hold the wheels 9 well beyond the bars 1 and the plate 4, so that said wheels 9 will roll freely along the floor, ground or pavement. In such use of the device, the plate 4 serves as a support to hold any articles upon the truck which may be easily manipulated and guided by the handles 3.

When it is desired to use the device as a step ladder or support in the adjustment shown in Fig. 1, the arms 6 are held in proper spaced relationship to the bars 1 by toggle links 11 connecting said arms 6 with the respective bars 1.

The arms 6 may also be connected by a rod 12, serving as a pivot for a pair of arms 13 having their lower ends connected by a 14, the ends of which extend laterally beyond the sides of the arms 13 a sufficient distance to engage in notches 15 in strips 16 attached to the inner sides of the bars 1. In such adjustment, the arms 6 and 13 are held in crossed positions (Fig. 3), so that the connections 17 and 18 between the upper ends of said arms are in approximately the same horizontal plane and in position to support an ironing board 19 or other article. In this use of the device, the parts 2 function as level supports for the body or base of the device comprising the bars 1.

From the foregoing it will be seen that my invention is an article of manufacture which is capable of being applied to many uses and in all of which uses, the bars 1 and arms 6 essentially cooperate with each other, and in the different uses, with other parts. The device is very convenient for household and store use and dispenses with the necessity for providing a number of different articles for different purposes, all of which purposes are served by this invention.

I claim:

A device of the character described comprising a pair of rigidly connected bars, a pair of arms pivoted to said bars, a bracket attached to each of said arms, a wheel pivoted to each of said brackets and movable by said arms beyond the plane of said bars to roll upon a floor when said arms are between said bars and said bars are in an inclined position.

LESLIE C. HILDERBRAND.